United States Patent [19]

Aganovic et al.

[11] Patent Number: 6,105,042

[45] Date of Patent: Aug. 15, 2000

[54] MULTI-USER INFORMATION MANAGEMENT SYSTEM ADAPTED FOR EFFICIENT, REMOTE, ON-DEMAND DOCUMENT MANAGEMENT, STORAGE AND RETRIEVAL

[75] Inventors: Zijad F. Aganovic; A. Stephen Rosenbaum, both of Boca Raton, Fla.

[73] Assignee: CyLex Systems, Inc., Boca Raton, Fla.

[21] Appl. No.: 09/023,352

[22] Filed: Feb. 13, 1998

[51] Int. Cl.$^7$ .............................. G06F 17/21; G09G 5/26

[52] U.S. Cl. ............................................ 707/500; 345/127

[58] Field of Search ...................................... 707/500, 526, 707/1–9, 100–104, 201, 513–516, 527; 345/418, 329–334, 156; 382/148, 173

[56] References Cited

U.S. PATENT DOCUMENTS

| | | | |
|---|---|---|---|
| 5,058,185 | 10/1991 | Morris et al. | 382/41 |
| 5,930,474 | 7/1999 | Dunworth et al. | 709/217 |
| 5,987,480 | 11/1999 | Donohue et al. | 707/501 |

*Primary Examiner*—Joseph H. Feild
*Assistant Examiner*—Alford W. Kindred
*Attorney, Agent, or Firm*—Gregory P. Gadson

[57] ABSTRACT

An improved information management system permits remote, on-demand storage and retrieval of documents including multimedia content, over low-speed communication links, while requiring only "thin" computing capability and a "thin wire" communication link. Heavy computing and data transfer-intensive processes are concentrated at the back end of the system, enabling the use of low bandwidth communication links, thereby obviating the need for users to purchase powerful (and hence expensive) microcomputers, servers, and complex software. The low bandwidth requirement leads to greater flexibility, whereby all manner of communication links can be used, including commonplace analog telephone lines, without significant degradation in performance. In real time retrieval and presentation of imaged documents, the system dynamically transforms stored documents to match the characteristics of a user's terminal and viewing option to avoid the transfer of a higher resolution document on lower resolution terminals. This significantly reduces document retrieval time and bandwidth requirements. The system additionally includes security and data protection measures for uploading and downloading operations.

44 Claims, 9 Drawing Sheets

PRIOR ART

MULTI-USER INFORMATION MANAGEMENT SYSTEM ADAPTED FOR EFFICIENT, REMOTE, ON-DEMAND DOCUMENT MANAGEMENT, STORAGE AND RETRIEVAL

FIELD OF THE INVENTION

The present invention generally relates to information management systems. More particularly, the present invention relates to document management systems capable of multi-user, remote, document management, storage and retrieval operation.

BACKGROUND OF THE INVENTION

Prior art information management systems, such as the one labeled 100 in FIG. 1, have been developed to electronically store digital representation of documents. Referring to FIG. 1, the system 100 is typically implemented via a local area network (LAN) 102. The network 100 contains one or more servers 104 and 106 for controlling the storage and retrieval of digital documents in a document storage memory 108.

The system 100 includes a number of users connected via several microcomputers or other types of computer terminals 110, 114, 116, and 118. A user desiring to electronically store a document can have the document scanned by a commercially available document scanner 112, which converts the document into a digital representation—perhaps a bit map of "1's" and "0's". The digitized document is transmitted via a microcomputer 110 over the network 102 to the servers 104 and 106.

The servers control the flow of information on the network 100, and are responsible for storing documents in a document storage area 108. The document storage area 108 can be a variety of memory storage devices as are known in the art. During a document retrieval operation, a user requests, via the servers, a particular document from memory 108. When the user's request is the next in the queue, the servers request the information from all of the memory locations comprising the requested document and integrate the information according to a stored linked list (linking all of the memory locations having information making up the document in question) for the document.

The servers forward the requested document to the microcomputer for the user's viewing and/or storage.

In prior art systems 100, a request for viewing (only) a document entails receiving the entire contents of the document by a terminal with sufficient processing power, cache and storage memory capacity (a "thick" computer). Alternatively, a low-end terminal can work suffficiently with the aid of a server, but will have viewing delays for large documents.

When prior art systems involve remote storage and retrieval rather than via a closed LAN, several problems are encountered. When a user wishes to view a stored document in such a remote storage/retrieval system, the user must either have a thick computer, or must be connected to a local server which gives the user an acceptable level of virtual computing power. Servers not only contain expensive hardware, but need expensive and time-consuming software maintenance. In either case, the communication link in such a system must use a high bandwidth to handle the capacity of information needed to make retrieval times for document viewing palatable.

Because of potential delays in viewing documents, prior art remote, document storage/retrieval systems do not allow for the participation of user's with stand-alone "thin" computers (those with lower computing power) at desirable retrieval speeds. Therefore, what is desired but not present in prior art remote document storage and retrieval systems, is one which allows the efficient participation of stand-alone "thin" users. That is, a system which allows for rapid displaying of stored documents—even where the user has a thin computer—and a low-bandwidth communication link.

The best prior art approaches have generally addressed the above problems in one of two ways. In a first approach, the host computer slices a document image into a multiplicity of strips—for example, one-inch wide. The entire image and the image strips are placed in mass storage. During a document retrieval operation, the user can view one or more strips (one at a time) of a document to keep from having to download the entire document while the user is deciding whether a particular document is of interest. This approach, however, does not improve the downloading speed, requires considerably more mass storage area, and a single strip is not always sufficient to decide whether the document should be downloaded.

In a second approach, the host computer creates and stores with each document, a number of indexed images with various pre-determined screen resolutions. It may also contain a number of tiles from each image which can be viewed in a zoom-in mode. In this approach, the user is limited to choosing from a fixed number of screen resolution versions of a desired document, which may not match the users actual resolution or panel size. Further, the borders of the zoom-in tiles may not be where they are most desired by the user. The need to create many special case image files, increased document storage area requirement, and less than optimum user flexibility make this complicated approach also problematic.

Several prior art patents are related to the present invention, although all contain the above-identified shortcomings.

U.S. Pat. No. 5,666,215 to Fredlund, et al. (issued Sep. 9, 1997), although not an information management system, or even a document image management system, discloses a system for allowing a customer to remotely view "positives" and order desired photographs from a central picture development entity, the positives being made from scanned negatives of the customer's camera film.

U.S. Pat. No. 5,440,401 to Parulski, et al. (issued Aug. 8, 1995), discloses a digital image system for storing in a common database of a storage medium (such as a CD, etc.), a file of a group of high-resolution images, along with an index data file with a montage of low-resolution "thumbnail" pictures of each of the high-resolution images. Each low-resolution thumbnail has an identifier which points to the associated high-resolution image.

U.S. Pat. No. 5,381,526 to Ellson (issued Jan. 10, 1995), discloses a digital imaging method/system in which an image is stored as two or more different linked image units on a storage medium, so that upon retrieval of the image, the image units can be combined for effects such as three-dimensional views, etc. The image units for an image can contain, for example, luminance and chrominance information in a first image unit, and pixel range information in a second linked image unit.

U.S. Pat. No. 5,414,811 to Parulski, et al. (issued May 9, 1995), discloses a digital image system for reducing the latency time of retrieving images from a storage medium such as a compact disc. When a particular image is downloaded into a user's image memory, adjacent images in the image database are also loaded into the image memory, so that if the user later wishes to retrieve one of the adjacent images, it need not be downloaded from the storage medium, and can thus be more rapidly displayed.

U.S. Pat. No. 5,235,654 to Anderson, et al. (issued Aug. 10, 1993), discloses an electronic document storage and retrieval system for allowing a user, via a workstation, to freely choose the form of a document to be generated from a common database of a host processor.

U.S. Pat. No. 5,200,993 to Wheeler, et al. (issued Apr. 6, 1993), discloses a public telephone-networked digital imaging system in which the communication protocol of the local network is converted to the communication protocol of the "backbone" network. Automatic Number Identification data is used to identify remote terminals.

U.S. Pat. No. 5,550,976 to Henderson, et al. (issued Aug. 27, 1996), discloses an electronic data management system of networked computers wherein data processing among the computers is asynchronous.

U.S. Pat. No. 5,235,680 to Bijnagte (issued Aug. 10, 1993), discloses a system limited to remote access to a centralized computer for the storage and retrieval of real estate listing information including images of property listed for sale.

U.S. Pat. No. 5,502,576 to Ramsay, et al. (issued Mar. 26, 1996), discloses a hybrid document imaging system using both digital and analog signals and signal processing to purportedly remove process speed limitations of digital signals while improving the resolution and precision problems associated with analog signals.

SUMMARY OF THE INVENTION

In view of the above limitations of the prior art, the present invention has the following objects.

A first object of the present invention is to provide an information management system with remote, on-demand information management, storage and retrieval, which has low hardware and software costs for clients.

A second object of the present invention is to provide an information management system with remote, on-demand information management, storage and retrieval, which has low back-end costs.

A third object of the present invention is to provide an information management system with remote, on-demand information management, storage and retrieval, which has low communication costs.

A fourth object of the present invention is to provide an information management system with remote, on-demand information management, storage and retrieval, which needs only a low bandwidth for communication and data transfer between a user and the host computer.

A fifth object of the present invention is to provide an information management system with remote, on-demand information management, storage and retrieval, which additionally provides security between a user and the host computer.

A sixth object of the present invention is to provide an information management system with remote, on-demand information management, storage and retrieval, which has low software maintenance and support requirements for users.

In view of the above objects, the present invention provides an information management system at least including:
  at least one electronic document storage vault for storing source digital documents;
  a host computer coupled to the document vault;
  at least one user computer system with at least a user computer terminal and a communication link for remotely coupling the host computer and the user computer terminal, the computer system for at least requesting from the host computer for display, documents stored in the document storage vault;
  the host computer at least including a processor for controlling the operation of the host computer, a document transformer for transforming all or part of source documents to presentation documents for display by the user computer terminal; and
  the user computer system at least including a user information management characterizer for determining one or more user information management characteristics of the user computer system and transmitting the user information management characteristics to the host computer;
  wherein the document transformer dynamically transforms the source document to a presentation document which substantially matches the user information management characteristics.

The present invention also provides an information management method implemented by an information management system, the method at least including the steps of:
  storing source digital documents in at least one electronic document storage vault;
  via a host computer coupled to the document vault, controlling the operation of the information management system;
  via at least one user computer system with at least a user computer terminal and a communication link for remotely coupling the host computer and the user computer terminal, requesting from the host computer for display, documents stored in the document storage vault;
  via a document transformer subsumed by the host computer, transforming all or part of source documents to presentation documents for display by the user computer terminal; and
  via a user information management characterizer subsumed by the user computer system, determining one or more user information management characteristics of the user computer system and transmitting the user information management characteristics to the host computer;
  wherein the document transformer dynamically transforms the source document to a presentation document which substantially matches the user information management characteristics.

The present invention is described in detail below, with reference to the drawing.

DESCRIPTION OF THE INVENTION

Used in connection with the description of the present invention, a remote, information management system includes means for the remote storage and retrieval of information. The information is not limited to digitized images of physical documents, but can be any sort of multimedia content, including image, audio, video, and data, for example. For the most part, "Document" will refer herein to a grouping of information which is either user-perceivable, or capable of being converted to user-perceivable information, but can also be in the form of pure data.

In as much as the documents addressed by the present invention can have any form of multimedia content, a "display" of a document involves converting the stored document to a user-perceivable form (i.e., reproducing the document or a facsimile thereof). Thus, during the display process, visual information is converted to either still or moving images, as is appropriate, and audio information is converted to aural stimuli, for example. The display characteristics of a user's computer terminal broadly relate to such characteristics as screen resolution, display panel size, and audio reproduction capabilities, including sound card type.

While the example system described below is adapted for document image management, it will be understood by those skilled in the pertinent art, that the present invention is adaptable for information management systems in general, where the "documents" have one or more types of multimedia content. The previously-mentioned definitions of "document," "display," "display characteristics," and others are intended to be included within the scope of those terms in the claims appended to this Letters Patent.

Figure 1:
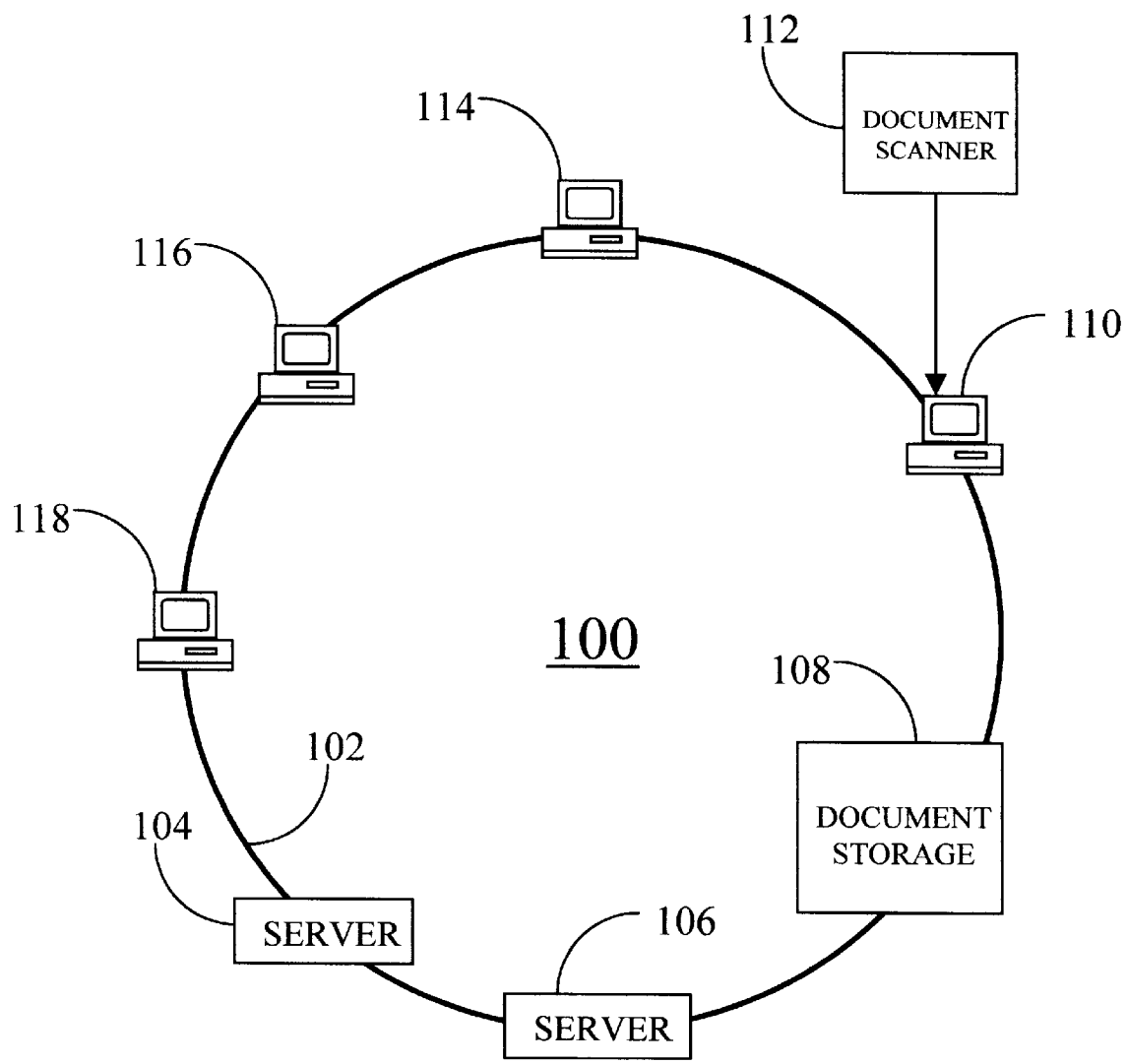
FIG. 1 is a schematic diagram of a prior art information management system.
Figure 2:
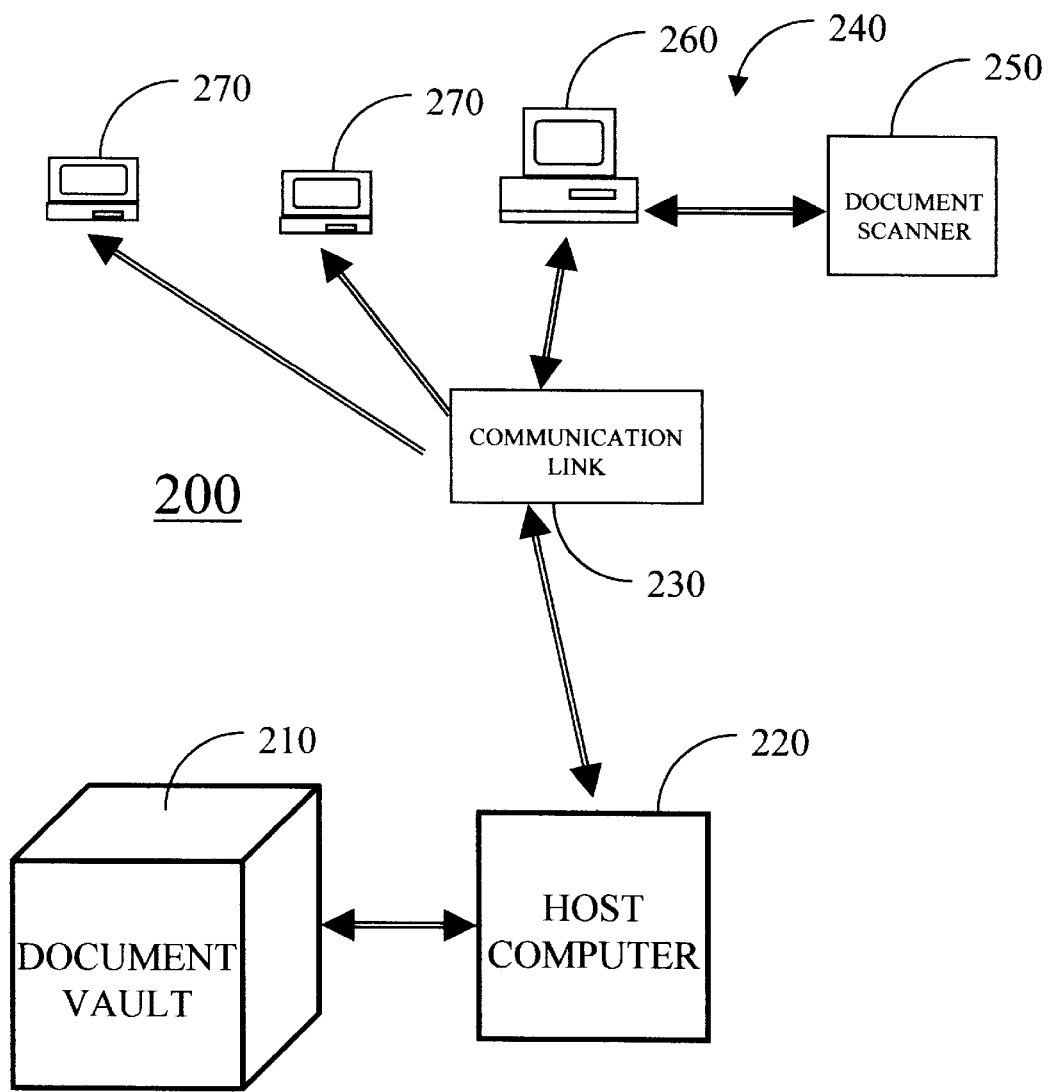
FIG. 2 is a schematic diagram of the present-inventive information management system.

FIG. 2 is a schematic diagram of the present-inventive information management system 200, which is adapted for remote, on-demand document storage and retrieval without the aforementioned limitations of the prior art. The major components of information management system 200 are: a document vault 210; a host computer 220; a communication link 230; user document input means 240 at least consisting of a document scanner 250 and a microcomputer 260; and several user computer terminals 270.

The document vault 210 is a memory array or group of memory storage devices with a large capacity, and preferably low latency for storing the information representing the user-accessible documents. In the preferred embodiment, the document vault 210 includes a Redundant Array of Inexpensive Disks (RAID), which allows for high capacity and data transfer speed, while providing the safety of backup storage. The RAID is ideally of the network-attached variety. Such RAIDs are commercially available from Open Systems Solutions, Inc. of Newtown, Pa, for example.

In the preferred embodiment, the host computer 220 is of at least the minicomputer variety, although in a small system, the host computer could be in the form of a high-end microcomputer. It is also the case that terminology such as "microcomputer," "minicomputer," and "mainframe" to describe processing speed and capacity have assumed less importance in recent years, due to advances in microprocessor speed and word sizes. Suffice it to say, that the information management system 200 must have a host computer capable of administering the storage and retrieval of documents among a large number of users in the preferred embodiment.

The communication link 230 can take a variety of forms, including the Internet, commonplace analog telephone lines, and Integrated Services Digital Networks (ISDNs), for example. As will be seen later, the present invention obviates the need for wide bandwidth communication links necessary for prior art information management systems capable of document image storage and retrieval.

A user can, either with his own hardware, or through the hardware of a third party (a commercial participant in the present system 200, for example), digitize documents and transmit these documents for storage in the document vault 210. For image documents, the document scanner 250 can be one of a variety of commercially available units. After digitizing a document, the image information is transferred to the computer 260, where it is preprocessed, if necessary, and then placed in a defined file format. The scanned document is transferred to the host computer 220 via the communication link 230, and then to the document vault 210, as will be detailed infra. In alternate embodiments, the document input means 240 contain means for incorporating various multimedia content into the documents.

A stored document can be viewed and retrieved, if desired, through one of several computer terminals 270. The computer terminals can be of various microcomputers ranging from low-end to high-end, either operating in stand-alone modes, or as part of a LAN, for example. The computer terminals 270 can even be network computers. In fact the user's computer can be either "thick" or "thin," whether or not operating in a stand-alone mode in the present-inventive information management system 200.

Figure 3:
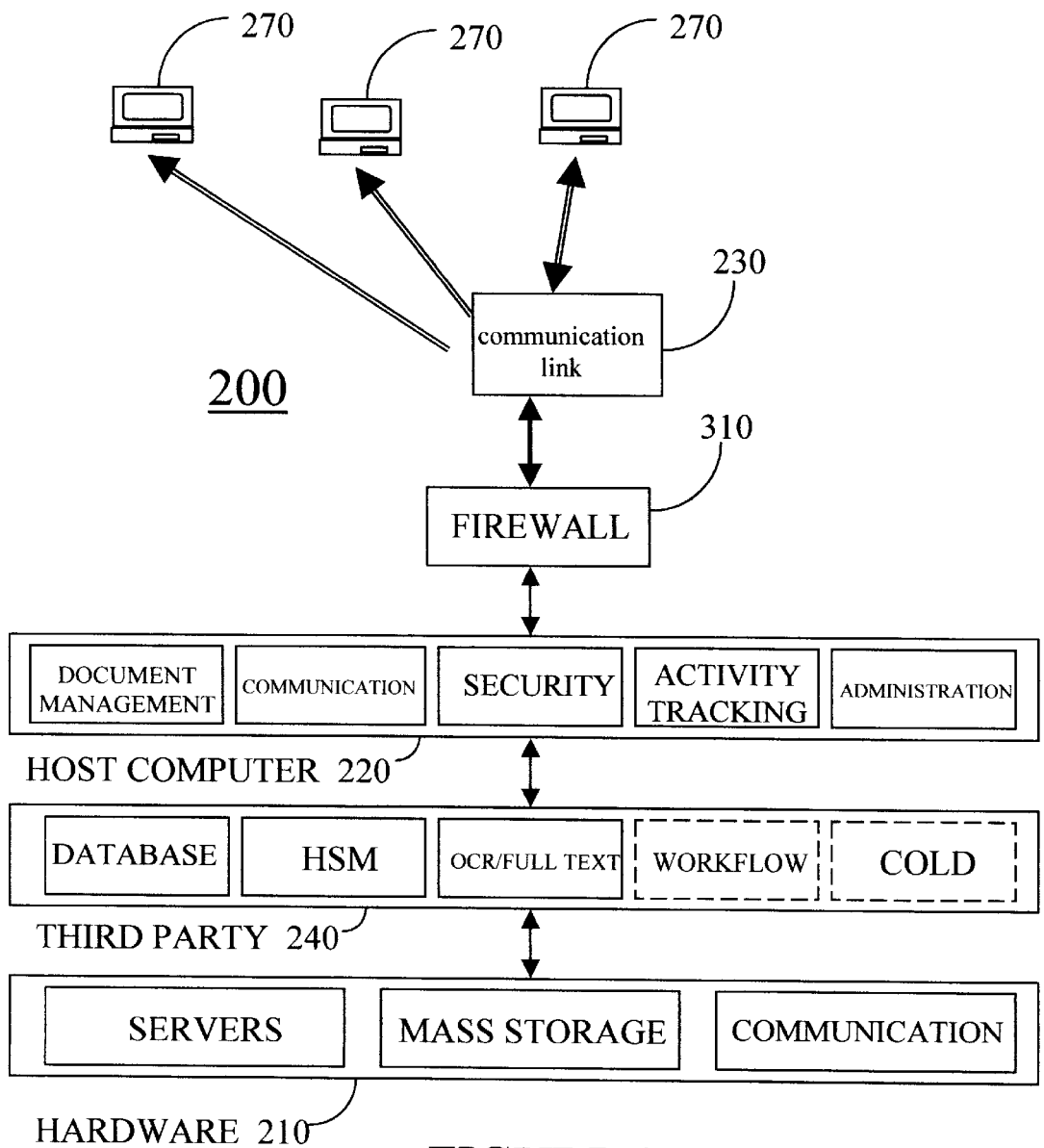
FIG. 3 is a further refinement of the present-inventive information management system of FIG. 2.

The information management system 200 will be further described with reference to FIG. 3. A firewall 310 exists between users and the back end of the system to provide security features, such as preventing unauthorized user access.

The host computer 220 contains several modules, briefly detailed here. A document management module is responsible for the formatting and storage of documents in the document vault 210, and the retrieval and transformation of stored source documents to "presentation documents" to be efficiently and rapidly displayed by a requesting user, as is part of present invention.

A communication module controls communication between the back end and front ends of the system 200. A security module only allows authorized users to access the system, and further, only to areas of the document vault designated for use by a particular user. An activity tracking module monitors the access and use of each user for survey and billing purposes. And, the host computer 220 handles the overall administration of the system 200.

The document input means 240 has several modules which can either be partially or wholly within a user/customer's control. It is envisioned that third parties referred to as "business partners" will administer the activities of the document input means 240, such as when a user wishes to store digitized documents which are facsimiles of a large number of physical documents. The document input means 240 can prepare data for document storage in a variety of ways in the system 200, including (but not limited to) database form, full text or image form with optical character recognition (OCR), computer output to laser disk (COLD), and methods incorporating hierarchical storage management (HSM).

The document vault 210 has a mass storage component such as networked RAIDs as previously mentioned, servers for controlling data input and output of the document vault, and a communication module for controlling communication.

The present invention enables a user with no more than a thin computer to view authorized documents. This is accomplished by having the system back end to perform all significant data management and all significant application logic to free the user's computer from those tasks. More importantly, rather than transferring a full requested document in all cases, the system 200 sends a presentation document to the user. The presentation document is tailored for optimum display by the user's computer terminal to enable rapid access. The present invention utilizes the fact that the viewing of a high-resolution image document, for example, generally requires a wideband communication link to give an acceptable acquisition time because of the large amount of data involved. However, the display resolution of the user's computer terminal is often much less. Since the user will only be able to view the retrieved document at the lower resolution of his terminal, the extra resolution transmitted in the full document by prior art information management systems gives no extra benefit, but in fact causes the viewing time to be slower than could otherwise be, and necessitates the use of a wideband communication link. A further limitation on the user's ability to view a document is the size of the user's display. As with the display resolution, the extra picture area of the viewed documents in prior art information management systems, is also wasted, where the display panel size (and the pixels associated therewith) is smaller than that of the requested document.

The same observations hold true with respect to documents containing various multimedia content. That is, transferring a document to a user with more details than the user's computer can reproduce or display results in less than optimal retrieval times for documents being displayed.

The solution to the above-identified problems according to the present invention is for the system 200 software installed in the user's computer terminal 270 to survey the user's computer terminal display characteristics, and to forward those characteristics to the host computer 220. The host computer 220 constructs from a requested source document, a presentation version matching the user's display characteristics. This allows for minimum downloading and display time.

While the retrieval operation detailed below is for an image document, it should be understood that a user's display characteristics involve any identifiable characteristics of the computer terminal. Thus, for documents with various multimedia content, such relevant display characteristics may include: display screen resolution; display screen panel size; type of sound card (if any); type of video card (if any); etc.

Figure 4:
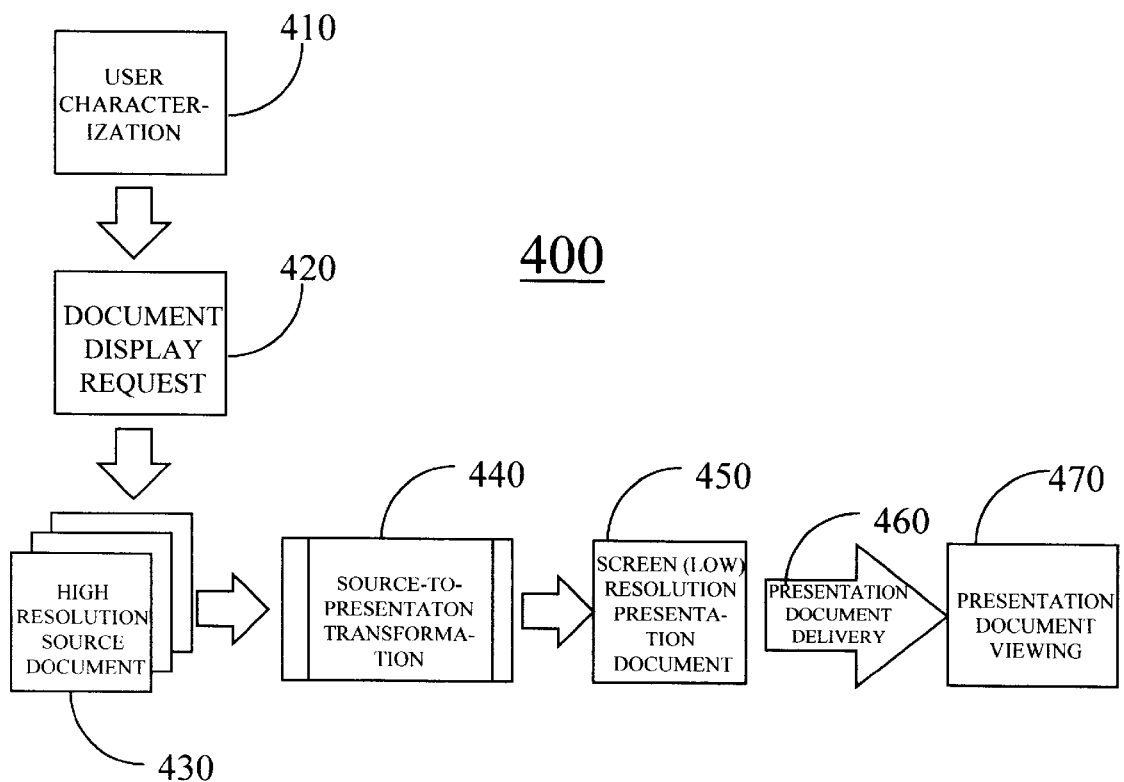
FIG. 4 is a generalized flow diagram illustrating the steps undertaken by the present-inventive information management system during a document display operation.

FIG. 4 is a generalized flow chart detailing the steps in the system 200 involved in a display operation 400 for displaying a requested document. The example presented is for the special case of an image document, but is easily expanded to include documents with other multimedia information.

In Step 410, system-specific software installed in each participating user's computer terminal ascertains said terminal's presentation characteristics, including those related to the actual display. In the preferred embodiment, the display characteristic software ("display characterizer") is initiated prior to logging onto the system 200. Because of this preprocessing, a later document display request can proceed without delay, rather than initiating Step 410 at the time of a document display request. In an alternate embodiment, the latter approach can be taken.

In Step 420, the user makes a document display request to the host computer 220 via the computer terminal 270 and the communication link 230. In a preliminary portion of the step (log-in), the host computer determines whether the proposed access is authorized by, for example, comparing a submitted password to the correct one. The host computer also receives the user's computer terminal display characteristics. A document display request specifies the document or documents desired for viewing.

In Step 430, the host computer 220 retrieves the requested document ("source document") from the document vault 210. The source document is transferred to the host computer in its full version. In the case of an image document, the source document is of a high-resolution variety.

In Step 440, the host computer transforms the source document to the presentation or display document of Step 450. As was previously mentioned, the transformation is made in accordance with the display characteristics of the requesting computer terminal. The presentation document contains the user terminal's screen resolution and panel size, to enable rapid display. Step 440 will be explained in greater detail with reference to FIG. 6.

The presentation document is delivered via the communication link 230 in Step 460, and finally displayed by the user at Step 470.

Figure 5:
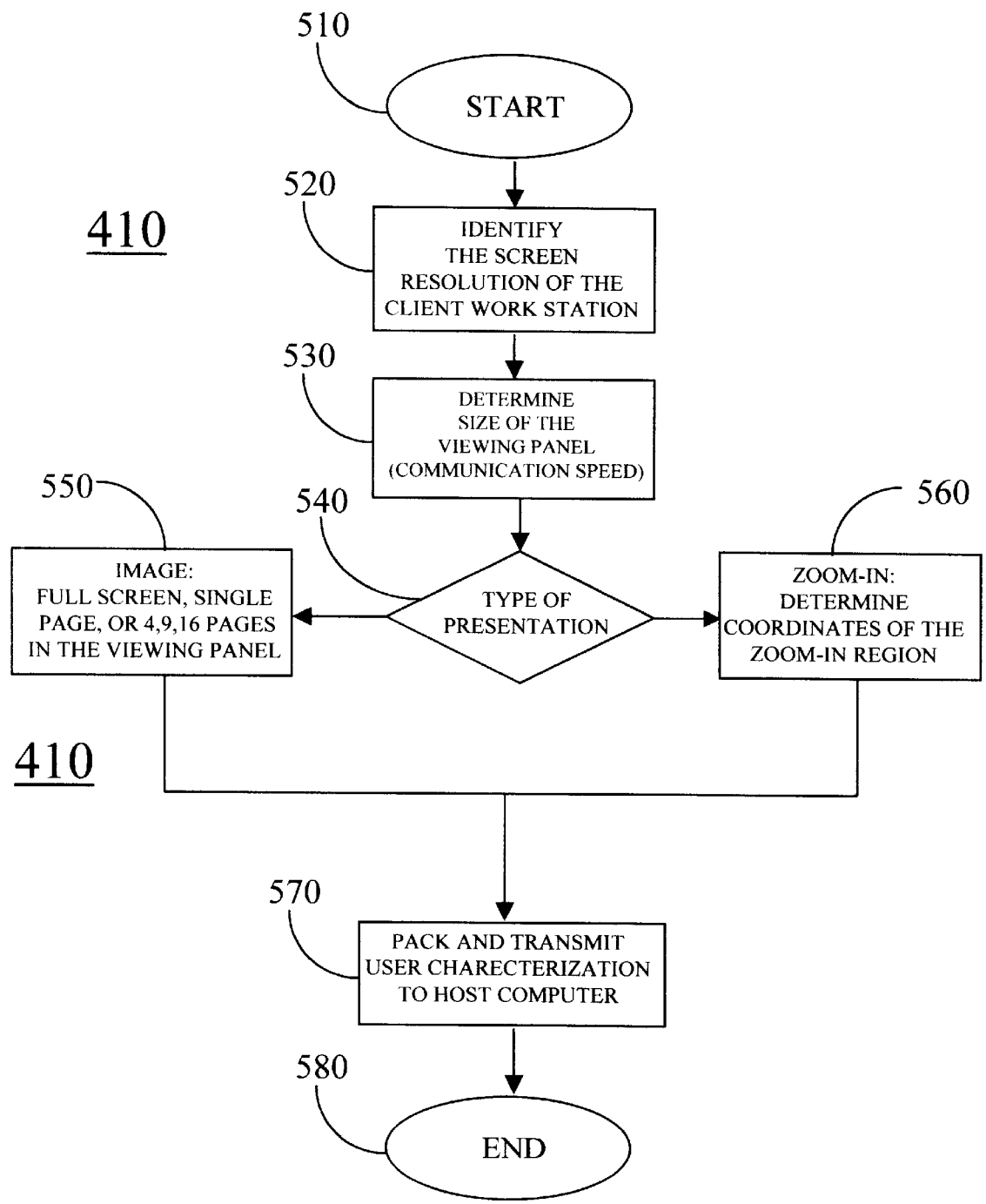
FIG. 5 is a generalized flow diagram of the user display characterization step in FIG. 4.

The user display characterization step 410 will now be described with reference to FIG. 5. After the user characterization program 410 is started at Step 510, the program identifies the screen resolution of the client/user workstation at Step 520. Examples of some common computer terminal monitor resolutions are: the VGA standard of 640×480 pixels; the SVGA standard of 800×600 pixels; and the SVGA standard of 1024×768 pixels.

Next, the program determines the viewing panel size and the available communication speed at Step 530. The viewing panel size can be either fixed for a document presentation or can change dynamically according to the user's instructions. Likewise, the communication speed can also be fixed or varied.

At Step 540 the program determines the type of presentation document desired by the user, such as a full image at Step 550 or a zoom-in image at Step 560. Or in the multi-page viewing mode, the program determines how many pages of a document will be displayed on a single screen. The zoom-in feature will be described in greater detailed infra., with reference to FIGS. 8 and 9.

The program packs and transmits the user characterization information to the host computer at Step 570, for use by the host computer during document transformation operations. Finally, the user characterization program ends at Step 580, and the display operation 400 returns to the "Document Display Request" Step 420 (FIG. 4).

For multimedia documents, the host computer can utilize the user's available communication speed and determine the maximum frame rate capable of delivery by the communication link. In more sophisticated applications the algorithm can be enhanced by enabling the user to control either the viewing panel size or the frame rate.

Figure 6:
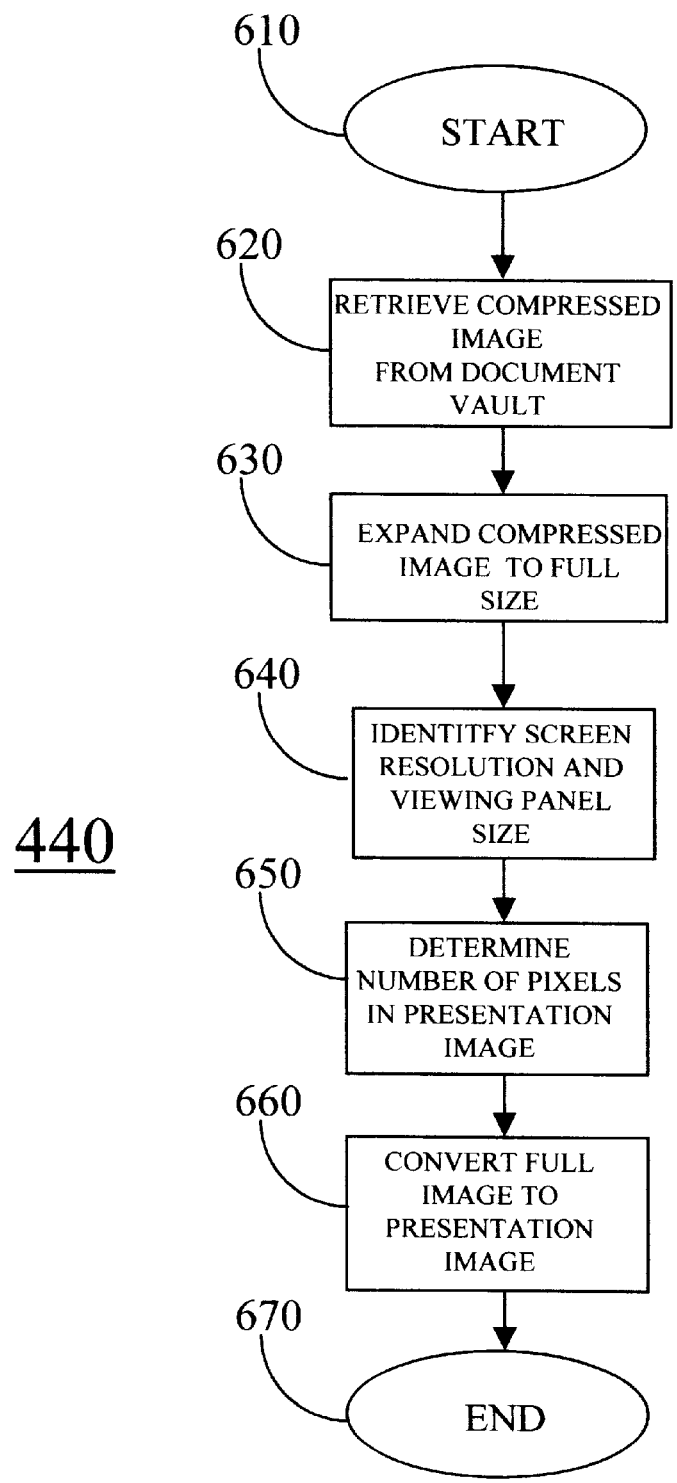
FIG. 6 is a generalized flow diagram of the source-to-presentation document step in FIG. 4.

The steps of the source document-to-presentation document process 440 are detailed in FIG. 6. Recall that Step 440 is carried out by the host computer 220. At the start of the process (Step 610) the host computer 220 retrieves the source document requested from the appropriate memory locations in the document vault 210. In the preferred embodiment, the source document is stored in a compressed format to reduce the necessary memory space. In Step 630 the host computer 220 expands the source document to its full size.

At Step 640 the host computer 220 identifies the user's display characteristics, which have been transmitted during the user's log-in to the system 200, along with the document display request. In the case of an image document, the display terminal's screen resolution and viewing panel size are identified. The panel can be full-size (for example, 11×8.5 inches), or any lesser size.

In Step 650, the host computer determines the number of pixels that will be present in the user's specified viewing panel. In some commercially available document scanners, the scanning resolution is 300 dots per inch. A scanned 8.5×11 inch source document will have (8.5·300)×(11·300) or 2550×3300 pixels. However, even viewing at full-screen size, a user's computer terminal using the VGA format has only 370×480 pixels (rounded) for a full size portrait view of and 8.5×11 document on the screen. As the user will only be able to view 370×480 pixels per image screen, any additional pixels contributing to a higher resolution serve no purpose for display-only operations. Therefore, the host computer determines from the display characteristics that the presentation document should only contain 480×370 pixels.

At Step 660, the host computer uniformly compresses and maps the source document in both the horizontal and vertical directions using known compression methods, to the viewing panel size. In the example given, the source document is compressed by a factor of approximately 6.875. That is, one pixel will exist in the presentation document for every 6.875 pixels in the source document. The resulting 370×480 pixel presentation document can now be formatted and forwarded to the user terminal 270 for display.

Figure 7:
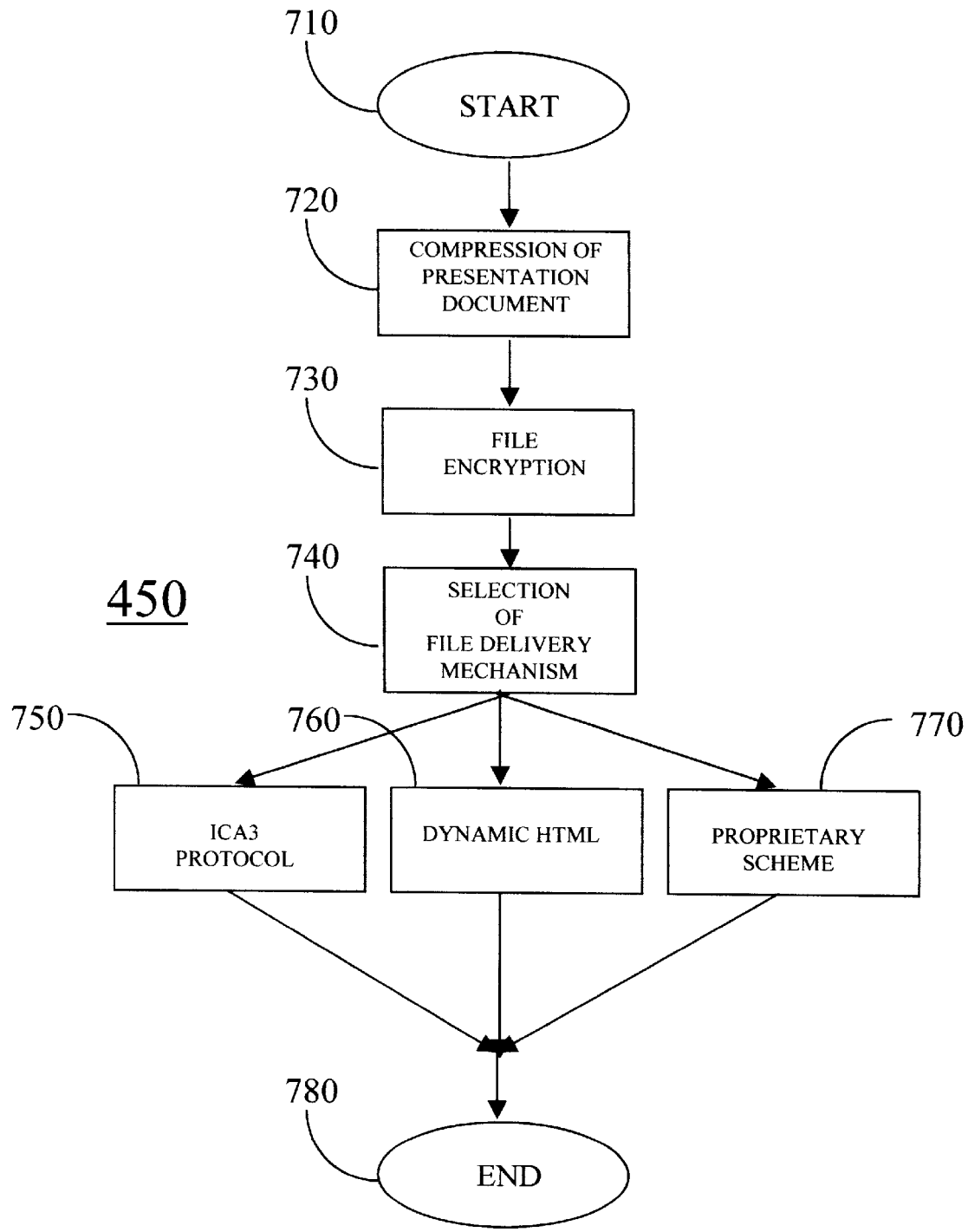
FIG. 7 is a generalized flow diagram of the screen resolution presentation step in FIG. 4.

FIG. 7 details Step 450 of FIG. 4, which involves preparing the presentation document for delivery to a user at a local computer terminal 270. The presentation document can be delivered through various communication links, and through a variety of protocols and delivery schemes. At Step 720 the presentation images are compressed into one more of a variety of image formats (in the case of image documents), including, but not limited to, Tagged Image File Format (TIFF), GIF, JPEG, etc. For added security, the presentation documents are encrypted through commercially available encryption schemes.

At Step 740, a file delivery mechanism is selected. In the preferred embodiment, delivery may be through the ICA3 Protocol (Step 750), Dynamic HTML (Step 760), various proprietary schemes (Step 770), and others.

The ICA3 Protocol requires the use of a WinFrame™ server, which is a variation of a Microsoft NT™ server. "WinFrame" is a trademark used by Citrix Systems.

Dynamic HTML requires the use of a commercially available WEB server (such as Netscape WEB, Microsoft Internet, and others), in combination with a commercially available Internet browser (such as Netscape, Microsoft Explorer, etc.) and a client program that will run as the browser plug-in or applet.

A proprietary scheme requires the use of one or more communication protocol (for example, TCP/IP, IPX/SPX, PPP) in combination with data transfer procedures which ensure reliable interactive data transfer for remote application management.

As a result of the reduced information content of the presentation documents, the communication link can have a low bandwidth. In fact, common analog telephone lines are sufficient for most document display operations.

Figure 8:
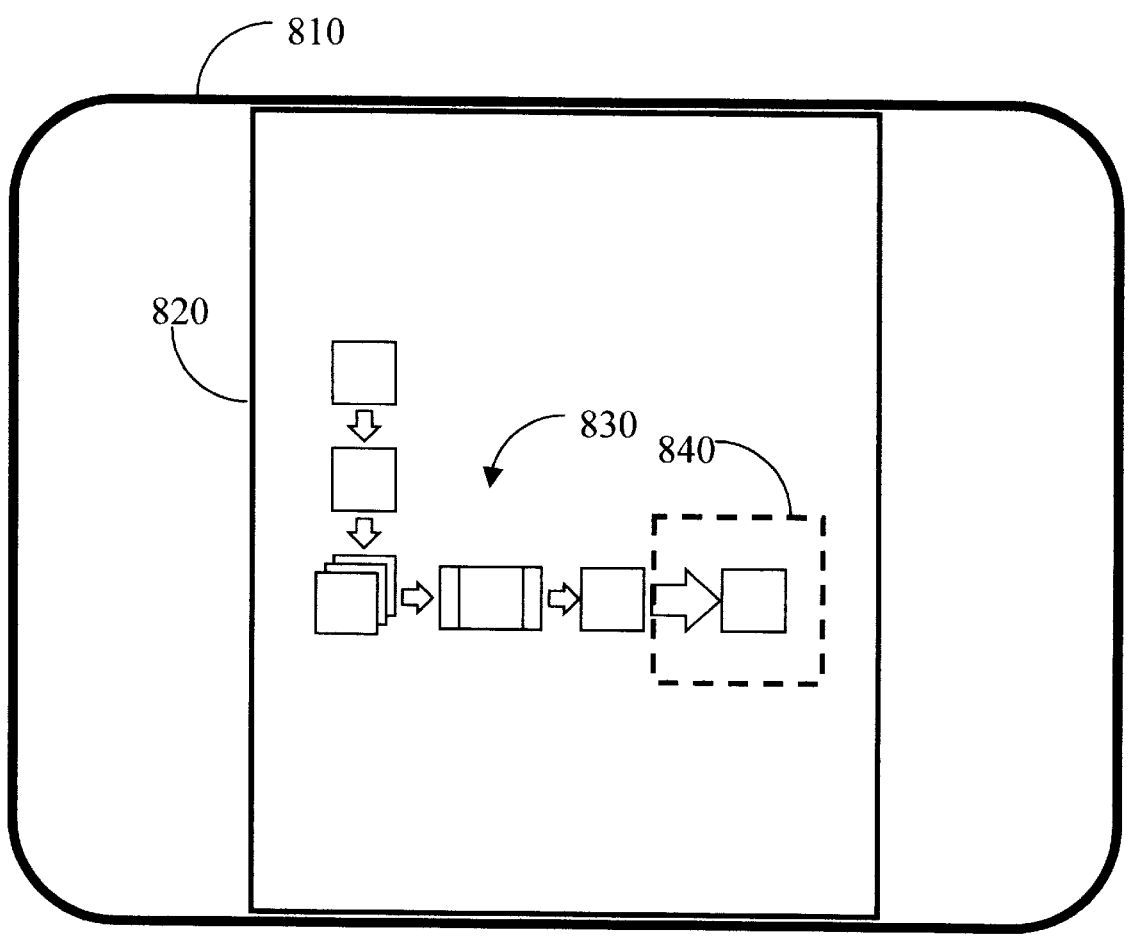
FIG. 8 is a sample display document with a zoom-in box shown as part of the zoom-in feature of the present invention.

In addition to the above-described features, the system 200 of the present invention also includes a "zoom-in" feature. The zoom-in feature allows a user to focus on a specific region for enlargement and increased details. FIG. 8 illustrates an example of a presentation document 820 being displayed on the user's computer terminal screen 810. If the user wishes to view a portion 840 of an image 830 in greater detail than is currently being displayed, the user can highlight the area with an input device such as by clicking appropriate buttons on a "mouse" to indicate the coordinates of the area 840 ("zoom-in box") of interest.

Figure 9:
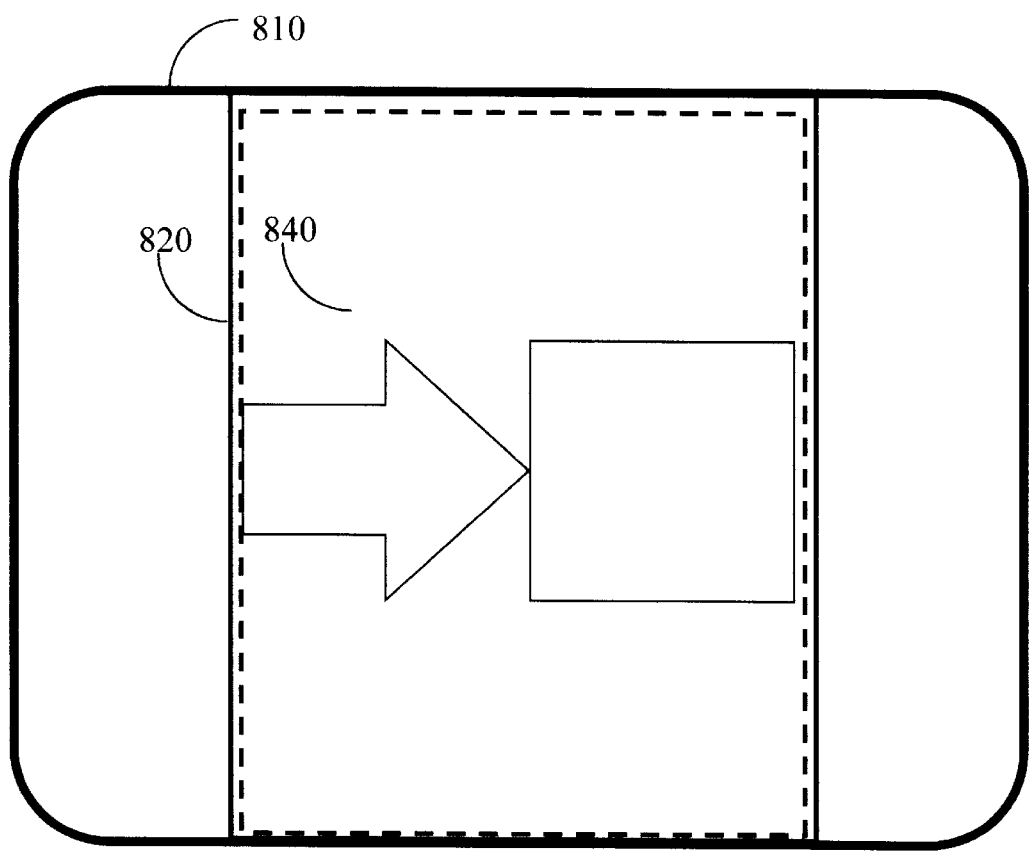
FIG. 9 is the presentation version of the zoom-in box identified in FIG. 7.

The user can then request a full-panel view of the zoom-in box 840 as shown in FIG. 9. The portion of the source document corresponding to the zoom-in box 840 is transformed by the host computer 220 to fit the screen resolution and panel size of the user's computer terminal display, as was detailed above with respect to FIG. 6. In addition to allowing the user to view a currently displayed image in greater detail in regions of interest, the zoom-in feature also allows the user to pre-screen, or examine portions of high resolution documents without having to download the entire document.

In a document with various forms of multimedia content, including graphics, text, audio, video, etc., the zoom-in feature is used for enhanced reproduction of elements of the document. For example, a multimedia clip can run in zoom-in mode, showing only the region of interest, or an audio clip in the presentation document might include a low sampling rate for compression of the audio information to decrease the time needed to download the presentation document. The corresponding audio clip in the source document might have included a much higher sampling rate. The penalty associated with this sampling rate conversion is a loss of detail, which may be more important for certain audio signals, such as music. By using the zoom-in feature, the user can listen to the entire sound clip or only a portion with higher fidelity.

Many audio clips have an associated time graph to indicate the duration of the clip, and various points of interest in the audio signal. Another variation of the zoom-in feature is to highlight a time interval of interest for reproduction at a higher sampling rate than in the current presentation document.

Documents which are mostly or exclusively comprised of audio signals can be downloaded at different speeds, depending on the user's reproduction capabilities or patience in waiting the extra time required for receiving high-quality audio.

The marking technique for establishing a zoom-in box for audio portions described above can also be used for reproducing portions of video clips and other multimedia content in greater detail.

Thus, a novel information management system for efficient, remote, on-demand document management, storage and retrieval—especially document displaying—has been described, having the advantages of a lower user hardware requirement (and hence lower cost to user), faster document displaying, and a lower communication link bandwidth requirement.

Variations and modifications of the present invention are possible, given the above description. However, all variations and modifications which are obvious to those skilled in the art to which the present invention pertains are considered to be within the scope of the protection granted by this Letters Patent.

While the example of the document display operation given above pertains to image documents, it should again be understood that documents can contain all manner of multimedia content, and that the presentation documents for these "multimedia" content documents are constructed in a similar fashion, by matching the multimedia characteristics of the display document to the display characteristics of the user's computer terminal.

As an example, the display characterization software of a user's computer terminal can survey the terminal for the presence and type of sound cards, video cards, and the like. In the case where the source document has an audio clip, and the user's terminal has no sound card, the presentation document will not include the audio clip, so as to minimize the necessary document downloading time. The same can be true of source documents containing information reproducible by a video card.

What is claimed:

1. An information management system comprising:
   at least one electronic document storage vault adapted for storing source digital documents;
   a host computer coupled to said document vault;
   at least one user computer system comprising a user computer terminal and a communication link adapted for remotely coupling said host computer and said user computer terminal, said computer system adapted for at least requesting from said host computer for display, documents stored in said document storage vault;
   said host computer comprising a processor adapted for controlling the operation of said host computer, a document transformer adapted for transforming all or part of source documents to presentation documents for display by said user computer terminal; and
   said user computer system comprising a user information management characterizer adapted for determining one or more user information management characteristics of said user computer system and transmitting, at the beginning of each document retrieval session, said user information management characteristics to said host computer;
   wherein said document transformer dynamically transforms said source document to a presentation document which substantially matches said user information management characteristics, and the transformation of said source document is carried out independent of any user information management characteristics stored prior to the current document retrieval session.

2. A information management system comprising:
   at least one electronic document storage vault for storing source digital documents;
   a host computer coupled to said document vault;
   at least one user computer system comprising a user computer terminal and a communication link for remotely coupling said host computer and said user computer terminal, said computer system for at least requesting from said host computer for display, documents stored in said document storage vault;
   said host computer comprising a processor for controlling the operation of said host computer, a document transformer for transforming all or part of source documents to presentation documents for display by said user computer terminal; and
   said user computer system comprising a user information management characterizer for determining one or more user information management characteristics of said user computer system and transmitting said user information management characteristics to said host computer;
   wherein said document transformer dynamically transforms said source document to a presentation document which substantially matches said user information management characteristics; and
   wherein said user information management characteristics include communication speed between said host computer and said user computer system.

3. The information management system in claim 1, wherein said user information management characteristics include user computer terminal characteristics and document retrieval options.

4. The information management system in claim 1, wherein said host computer further comprises:
   a data manager adapted for carrying out all data management of said information management system exclusively within said host computer; and
   an application logic manager adapted for carrying out all application logic of said information management system exclusively within said host computer.

5. The information management system in claim 3, wherein said user computer terminal characteristics and document retrieval options include screen resolution.

6. The information management system in claim 3, wherein said user computer terminal characteristics and document retrieval options include screen panel size.

7. An information management system comprising:
   at least one electronic document storage vault adapted for storing source digital documents;
   a host computer coupled to said document vault;
   at least one user computer system comprising a user computer terminal and a communication link adapted for remotely coupling said host computer and said user computer terminal, said computer system adapted for at least requesting from said host computer for display, documents stored in said document storage vault;
   said host computer comprising a processor adapted for controlling the operation of said host computer, a document transformer adapted for transforming all or part of source documents to presentation documents for display by said user computer terminal; and
   said user computer system comprising a user information management characterizer adapted for determining one or more user information management characteristics of said user computer system and transmitting said user information management characteristics to said host computer;
   wherein said document transformer dynamically transforms said source document to a presentation document which substantially matches said user information management characteristics;
   wherein said user information management characteristics include user computer terminal characteristics and document retrieval options; and
   wherein said user computer terminal characteristics and document retrieval options include the presence and type of sound card in said user computer terminal.

8. An information management system comprising:

at least one electronic document storage vault adapted for storing source digital documents;

a host computer coupled to said document vault;

at least one user computer system comprising a user computer terminal and a communication link adapted for remotely coupling said host computer and said user computer terminal, said computer system adapted for at least requesting from said host computer for display, documents stored in said document storage vault;

said host computer comprising a processor adapted for controlling the operation of said host computer, a document transformer adapted for transforming all or part of source documents to presentation documents for display by said user computer terminal; and said user computer system comprising a user information management characterizer adapted for determining one or more user information management characteristics of said user computer system and transmitting said user information management characteristics to said host computer;

wherein said document transformer dynamically transforms said source document to a presentation document which substantially matches said user information management characteristics;

wherein said user information management characteristics include user computer terminal characteristics and document retrieval options; and wherein said user computer terminal characteristics and document retrieval options include the presence and type of video card in said user computer terminal.

9. The information management system in claim 3, wherein said user computer terminal characteristics and document retrieval options include one or more image file formats.

10. An information management system comprising:

at least one electronic document storage vault adapted for storing source digital documents;

a host computer coupled to said document vault;

at least one user computer system comprising a user computer terminal and a communication link adapted for remotely coupling said host computer and said user computer terminal, said computer system adapted for at least requesting from said host computer for display, documents stored in said document storage vault;

said host computer comprising a processor adapted for controlling the operation of said host computer, a document transformer adapted for transforming all or part of source documents to presentation documents for display by said user computer terminal; and said user computer system comprising a user information management characterizer adapted for determining one or more user information management characteristics of said user computer system and transmitting said user information management characteristics to said host computer; and a user-activated zoom-in identifier adapted for identifying for display in greater detail by said user computer terminal, spatial or temporal regions in a currently displayed presentation document;

wherein said document transformer dynamically transforms said source document to a presentation document which substantially matches said user information management characteristics;

wherein said user information management characteristics include user computer terminal characteristics and document retrieval options; and wherein said document transformer transforms the portions of said source document corresponding to the identified regions, to substantially match said user computer terminal characteristics and document retrieval options.

11. The information management system in claim 10, wherein said user computer terminal characteristics and document retrieval options include screen resolution.

12. The information management system in claim 10, wherein said user computer terminal characteristics and document retrieval options include screen panel size.

13. The information management system in claim 10, wherein said user computer terminal characteristics and document retrieval options include the presence and type of sound card in said user computer terminal.

14. The information management system in claim 10, wherein said user computer terminal characteristics and document retrieval options include the presence and type of video card in said user computer terminal.

15. The information management system in claim 10, wherein said user computer terminal characteristics and document retrieval options include one or more image file formats.

16. The information management system in claim 1, wherein said document vault comprises a plurality of secure areas, each secure area associated with a user, and said host computer further comprises an access verifier for verifying that access to a particular document or secure area in which it is stored, is authorized by the requesting user.

17. The information management system in claim 1, further comprising:

an activity tracker adapted for tracking the documents stored, displayed or retrieved by a user.

18. The information management system in claim 1, wherein said communication link comprises a low-speed analog telephone line.

19. The information management system in claim 1, wherein said communication link comprises an Integrated Services Digital Network (ISDN) line.

20. The information management system in claim 1, wherein said communication link comprises the World Wide Web.

21. The information management system in claim 1, further comprising:

a document scanner adapted for converting a physical document into a digitally imaged document; and a document transmitter adapted for transmitting digitally imaged documents to said host computer for storage in said document vault.

22. The information management system in claim 10, further comprising:

a document scanner adapted for converting a physical document into a digitally imaged document; and a document transmitter adapted for transmitting digitally imaged documents to said host computer for storage in said document vault.

23. An information management method implemented by an information management system, said method comprising the steps of:

storing source digital documents in at least one electronic document storage vault;

via a host computer coupled to said document vault, controlling the operation of said information management system;

via at least one user computer system comprising a user computer terminal and a communication link adapted for remotely coupling said host computer and said user computer terminal, requesting from said host computer for display, documents stored in said document storage vault;

via a document transformer subsumed by said host computer, transforming all or part of source documents to presentation documents for display by said user computer terminal; and via a user information management characterizer subsumed by said user computer system, determining one or more user information management characteristics of said user computer system and transmitting, at the beginning of each document retrieval session, said user information management characteristics to said host computer;

wherein said document transformer dynamically transforms said source document to a presentation document which substantially matches said user information management characteristics; and wherein the transformation of said source document is carried out independent of any user information management characteristics stored prior to the current document retrieval session.

24. An information management method implemented by an information management system, said method comprising the steps of:

storing source digital documents in at least one electronic document storage vault;

via a host computer coupled to said document vault, controlling the operation of said information management system;

via at least one user computer system comprising a user computer terminal and a communication link for remotely coupling said host computer and said user computer terminal, requesting from said host computer for display, documents stored in said document storage vault;

via a document transformer subsumed by said host computer, transforming all or part of source documents to presentation documents for display by said user computer terminal; and via a user information management characterizer subsumed by said user computer system, determining one or more user information management characteristics of said user computer system and transmitting said user information management characteristics to said host computer;

wherein said document transformer dynamically transforms said source document to a presentation document which substantially matches said user information management characteristics; and wherein said user information management characteristics include communication speed between said host computer and said user computer system.

25. The information management method in claim 23, wherein said user information management characteristics include user computer terminal characteristics and document retrieval options.

26. The information management method in claim 23, wherein said controlling step further comprises the steps of:

via a data manager, carrying out all data management of said information management system exclusively within said host computer; and via an application logic manager, carrying out all application logic of said information management system exclusively within said host computer.

27. The information management method in claim 25, wherein said user computer terminal characteristics and document retrieval options include screen resolution.

28. The information management method in claim 25, wherein said user computer terminal characteristics and document retrieval options include screen panel size.

29. An information management method implemented by an information management system, said method comprising the steps of:

storing source digital documents in at least one electronic document storage vault;

via a host computer coupled to said document vault, controlling the operation of said information management system;

via at least one user computer system comprising a user computer terminal and a communication link adapted for remotely coupling said host computer and said user computer terminal, requesting from said host computer for display, documents stored in said document storage vault;

via a document transformer subsumed by said host computer, transforming all or part of source documents to presentation documents for display by said user computer terminal; and via a user information management characterizer subsumed by said user computer system, determining one or more user information management characteristics of said user computer system and transmitting said user information management characteristics to said host computer;

wherein said document transformer dynamically transforms said source document to a presentation document which substantially matches said user information management characteristics;

wherein said user information management characteristics include user computer terminal characteristics and document retrieval options; and wherein said user computer terminal characteristics and document retrieval options include the presence and type of sound card in said user computer terminal.

30. An information management method implemented by an information management system, said method comprising the steps of:

storing source digital documents in at least one electronic document storage vault;

via a host computer coupled to said document vault, controlling the operation of said information management system;

via at least one user computer system comprising a user computer terminal and a communication link adapted for remotely coupling said host computer and said user computer terminal, requesting from said host computer for display, documents stored in said document storage vault;

via a document transformer subsumed by said host computer, transforming all or part of source documents to presentation documents for display by said user computer terminal; and via a user information management characterizer subsumed by said user computer system, determining one or more user information management characteristics of said user computer system and transmitting said user information management characteristics to said host computer;

wherein said document transformer dynamically transforms said source document to a presentation document which substantially matches said user information management characteristics;

wherein said user information management characteristics include user computer terminal characteristics and document retrieval options; and wherein said user computer terminal characteristics and document retrieval options include the presence and type of video card in said user computer terminal.

31. The information management method in claim 25, wherein said user computer terminal characteristics and document retrieval options include one or more image file formats.

32. An information management method implemented by an information management system, said method comprising the steps of:

storing source digital documents in at least one electronic document storage vault;

via a host computer coupled to said document vault, controlling the operation of said information management system;

via at least one user computer system comprising a user computer terminal and a communication link adapted for remotely coupling said host computer and said user computer terminal, requesting from said host computer for display, documents stored in said document storage vault;

via a document transformer subsumed by said host computer, transforming all or part of source documents to presentation documents for display by said user computer terminal;

via a user information management characterizer subsumed by said user computer system, determining one or more user information management characteristics of said user computer system and transmitting said user information management characteristics to said host computer; and via a user-activated zoom-in identifier, identifying for display in greater detail by said user computer terminal, spatial or temporal regions in a currently displayed presentation document;

wherein said document transformer dynamically transforms said source document to a presentation document which substantially matches said user information management characteristics;

wherein said user information management characteristics include user computer terminal characteristics and document retrieval options; and wherein said document transformer transforms the portions of said source document corresponding to the identified regions, to substantially match said user computer terminal characteristics and document retrieval options.

33. The information management method in claim 32, wherein said user computer terminal characteristics and document retrieval options include screen resolution.

34. The information management method in claim 32, wherein said user computer terminal characteristics and document retrieval options include screen panel size.

35. The information management method in claim 32, wherein said user computer terminal characteristics and document retrieval options include the presence and type of sound card in said user computer terminal.

36. The information management method in claim 32, wherein said user computer terminal characteristics and document retrieval options include the presence and type of video card in said user computer terminal.

37. The information management method in claim 32, wherein said user computer terminal characteristics and document retrieval options include one or more image file formats.

38. The information management method in claim 23, further comprising the steps of:

defining in said document vault, a plurality of secure areas, each secure area associated with a user; and via an access verifier subsumed by said host computer, verifying that access to a particular document or secure area in which it is stored, is authorized by the requesting user.

39. The information management method in claim 23, further comprising the step of:

via an activity tracker, tracking the documents stored, displayed or retrieved by a user.

40. The information management method in claim 23, wherein said communication link comprises a low-speed analog telephone line.

41. The information management method in claim 23, wherein said communication link comprises an Integrated Services Digital Network (ISDN) line.

42. The information management method in claim 23, wherein said communication link comprises the World Wide Web.

43. The information management method in claim 23, further comprising the steps of:

via a document scanner, converting a physical document into a digitally imaged document; and via a document transmitter, transmitting digitally imaged documents to said host computer for storage in said document vault.

44. The information management method in claim 32, further comprising the steps of:

via a document scanner, converting a physical document into a digitally imaged document; and via a document transmitter, transmitting digitally imaged documents to said host computer for storage in said document vault.

* * * * *